F. W. HOCHSTETTER.
SHUTTER MECHANISM FOR MOVING PICTURE MACHINES.
APPLICATION FILED JUNE 20, 1913.
1,115,538.
Patented Nov. 3, 1914.
2 SHEETS—SHEET 2.
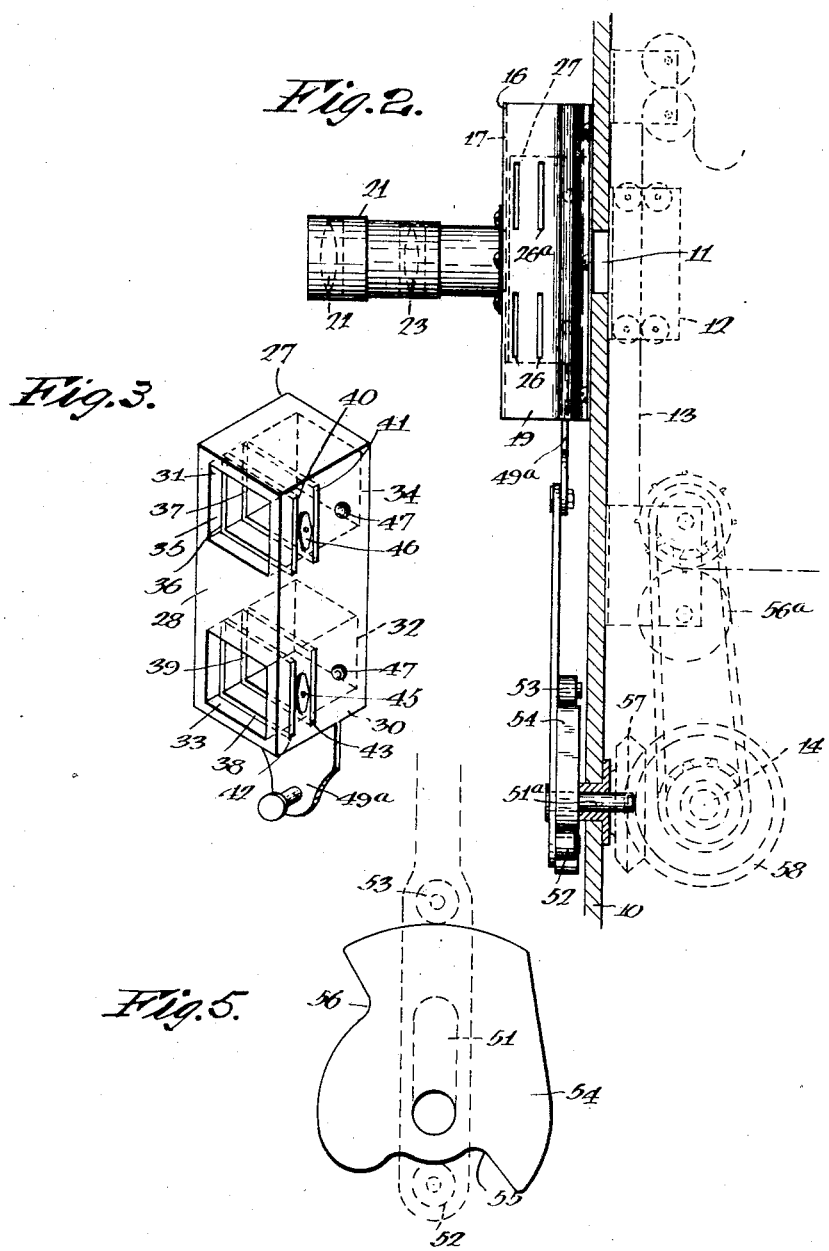
Witnesses:
Charles C. Abbe
M. Dumody
Inventor
Frederick W. Hochstetter.
By his Attorney
W. T. Criswell.

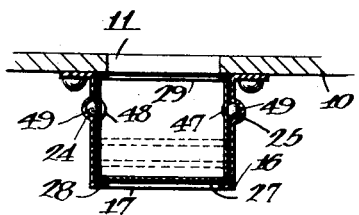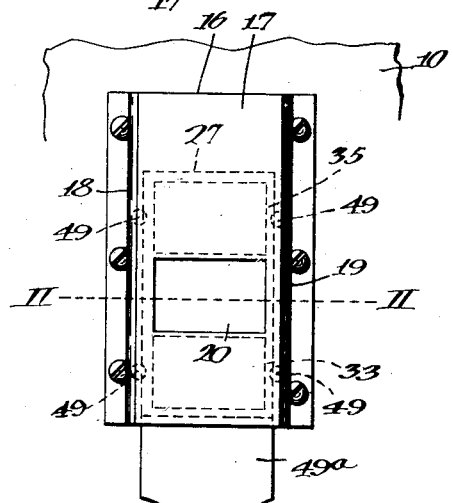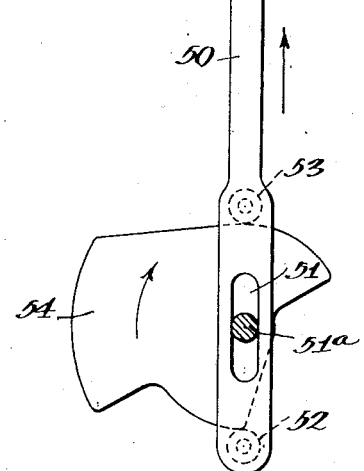

UNITED STATES PATENT OFFICE.

FREDERICK W. HOCHSTETTER, OF NEW YORK, N. Y., ASSIGNOR TO H. P. PATENTS AND PROCESSES COMPANY, INC., A CORPORATION OF NEW YORK.

SHUTTER MECHANISM FOR MOVING-PICTURE MACHINES.

1,115,538.  Specification of Letters Patent.  Patented Nov. 3, 1914.

Application filed June 20, 1913. Serial No. 774,865.

*To all whom it may concern:*

Be it known that I, FREDERICK W. HOCHSTETTER, a subject of the Emperor of Germany, and a resident of New York, county and State of New York, have invented a certain new and useful Improvement in Shutter Mechanism for Moving-Picture Machines, of which the following is a full, clear, and exact specification.

This invention relates to a class of shutters adapted to be used in conjunction with machines for producing and exhibiting moving pictures in natural colors.

My invention has for its object primarily to provide a shutter mechanism designed to be employed in conjunction with a camera adapted for photographing scenery, or other objects whereby the natural colors thereof may be accurately recorded upon a sensitized plate, or film, and which is susceptible of being used with a projecting apparatus for displaying the pictures when developed in their natural colors upon a curtain, or screen. This is accomplished mainly by providing a reciprocable shutter having a plurality of apertures in each of which are mounted one, or a number of transparent plates, or slides of the primary colors for guidance across the exposure window of the camera when the negative plate, or film is being produced as well as being subsequently directed in a corresponding manner across the exposure window of a projecting apparatus when the pictures are exhibited.

Another object of the invention is to provide means adapted to operate the shutter mechanism simultaneously with the operation of the camera, or projecting apparatus; and still another object of the invention is to provide means whereby an intermittent movement may be imparted to the shutter during its reciprocation.

A further object of the invention is to provide a shutter of simple and efficient construction wherein any desired number of the colored transparent slides may be employed, and which is adapted for use with equal facility in conjunction with a camera, or a projecting apparatus.

With these and other objects in view, the invention will be hereinafter more particularly described with reference to the accompanying drawings, which form a part of this specification, and will then be pointed out in the claims at the end of the description.

In the drawings, Figure 1 is a front elevation of one form of shutter mechanism embodying my invention. Fig. 2 is a fragmentary section, partly in detail, through the front portion of a camera, or projecting apparatus, showing a side view of the shutter mechanism applied thereto. Fig. 3 is a perspective view of the form of box used in the mechanism. Fig. 4 is a section taken on the line II—II of Fig. 1, and Fig. 5 is an enlarged fragmentary view, showing a front elevation of the disk cam employed in the mechanism for reciprocating the box, and for intermittently checking the box during its reciprocatory movement.

The shutter mechanism is designed to be applied to the front wall 10 having an exposure window 11 of any well known, or preferred type of camera, or projecting apparatus used for producing and exhibiting moving pictures of scenery, or other objects, and which are provided with a framing device 12 serving to yieldingly guide a film, as 13, and hold it intermittently for exposure before the window 11 when transmitted through the machine, the shutter mechanism and the machine being operable in unison by a common drive shaft, as 14, which may be driven by a crank handle or otherwise.

The shutter mechanism has a casing 16 composed of a front wall 17 and spaced side walls 18 and 19 which are secured by screws, or otherwise to the wall 10 of the camera, or projecting apparatus. In the front wall 17 of the casing is a window 20 which is in register with the exposure window 11 of the machine, and to said front wall 17 at its window is held a telescopic barrel 21 carrying one, or more of the usual lenses, as 22 and 23. At corresponding parts of the inner surfaces of the side walls 18 and 19 of the casing 16 are vertically disposed grooves 24 and 25, and at intervals through the side wall 19 are vertically disposed pairs of spaced openings 26 and 26ª.

Within the casing 16 is a reciprocable box, as 27, which provides the shutter proper of the mechanism. The box 27 is substantially rectangular in shape so as to provide a front wall 28, a rear wall 29, and two spaced side walls 30 and 31. Through the lower portion of the rear wall 29 is an aperture 32, and in register with this aperture is an aperture 33 provided in the lower part of the front wall 28. Through the upper portion of the rear wall 29 is an aperture 34, and in register with this aperture is an aperture 35 also provided in the front wall 28. The apertures 32 and 33 form a passage through the box, and the apertures 34 and 35 form a second passage through the box. When the box 27 is reciprocated in the casing 16 and intermittently checked, as will be hereinafter more fully explained, the apertures 32 and 33 and the apertures 34 and 35 are adapted to be alternately registered with the exposure window 11 of the machine and with the window 20 of the casing 16 for admitting therethrough the rays of light when focused through the lenses 22 and 23.

In the inner surface of the upper part of the side wall 30 of the box are two spaced parallel grooves 36 and 37 both of which are vertically disposed, and also in the inner surface of the lower part of said side wall are two similar spaced vertically disposed parallel grooves 38 and 39. Through corresponding parts of the upper portion of the side wall 30 of the box are provided two spaced parallel vertically disposed slots 40 and 41, and through the lower part of this side wall, at parts thereof corresponding to the grooves 38 and 39 of the side wall 30, are two spaced parallel slots 42 and 43 which are also vertically disposed. Each of the slots and one of the grooves are thereby arranged in sets, and in one or more of the sets may be removably inserted a colored transparent plate, each of which is preferably of one of the primary colors. In this manner the colored transparent plates will be disposed transversely of the interior of the box 27 for being directed when the box is reciprocated across the path of the rays of light focused from the lenses 22 and 23 through the window 20 of the casing 16, and a desired number of the transparent plates either of a single color, or of different separate colors may be used in conjunction with the shutter whereby the natural colors of the objects may be effectually recorded upon the sensitized film when being photographed as well as exhibiting the pictures in life-like tints when projected upon a curtain. In order to permit the colored transparent plates to be inserted into, or removed from the sets of the slots and the grooves, the box 27 is moved in the casing 16 so that either the pairs of slots 40 and 41, or the pairs of slots 42 and 43 of the side wall 30 of the box are in register with one of the pairs of the openings 26 and 26$^a$ of the casing 16. One, or more of the colored transparent plates 44 may then be inserted through one or more of the openings 26 and 26$^a$ and into the sets of the slots and the grooves of the box, or the colored transparent plates may be removed from the box in a similar manner.

Serving as means to permit the colored transparent plates to be held against accidental displacement when positioned in the sets of the slots and the grooves of the box 27, upon the exterior of the side wall 30 of said box and between the slots 40 and 41 is pivoted a clip 45, and between the slots 42 and 43 on the exterior of this side wall is pivoted a second clip 46. The clips 45 and 46 are preferably of elliptical shapes, and said clips are of sufficient lengths, as shown, so that when rotated accordingly the opposite ends thereof will engage the edges of the colored transparent plates when arranged in the box.

In the exterior of the side walls 30 of the box 27 are spaced pockets, as 47, and in similar parts of the exterior of the side wall 31 of said box are spaced pockets 48. The pockets of each of the walls of the box 27 are in register with each of the vertical grooves 24 and 25, respectively, of the side walls of the casing 16, and in each of said pockets is a revoluble ball, as 49. The balls of the pocket 47 are movably seated in the groove 24, and the balls of the pockets 48 are movably seated in the groove 25. Antifriction bearings are thus provided for permitting the box 27 to be freely and accurately guided when reciprocated in the casing 16.

For the purpose of permitting the box 27 to be reciprocated in the casing 16 simultaneously with the operation of the camera, or projecting apparatus, and also to permit at the same time an intermittent movement to be imparted to said box, to a lug 49$^a$ provided on the underside of the box is pivoted one end of a connecting rod 50 having an elongated opening 57 adjacent to its other end. Through the opening 51 is removably disposed a pin 51$^a$ rotatably held in the front wall of the camera, or projecting apparatus. At the free end of the rod 50 upon one of its faces is a freely rotatable roller, or small wheel 52, and approximately midway of the rod 50 is a second roller, or small wheel 53. On the pin 51$^a$ is a cam disk 54. The cam 54 is rigidly held eccentrically upon the pin so as to be rotated therewith, and said cam is positioned whereby its edge will contact with both of the rollers 52 and 53 of the rod 50 so that when revolved by the rotation of the pin a reciprocatory movement will be imparted to the cam 54 and to the connecting rod 50. The box 27 will in turn be reciprocated in the casing 16 for directing its passages across the window 20 of the casing. The cam 54 has an irregularly curved edge whereby two depressions, as 55 and 56, are formed in approximately opposite parts thereof so that during the revolutions of the cam the rollers 52 and 53 will be received therein, and the reciprocatory movement of the cam 54 and the connecting rod 50 as well as the box 27 will be partially checked at intervals for intermittently registering the colored transparent plates 44 with the window 20 of the casing 16. In order to permit the shutter to be operated in unison with the operation of the mechanism, as 56ª, of the camera, or projecting apparatus by the rotation of the drive shaft 14, on the pin 51ª may also be provided a bevel gear 57 in mesh with a bevel gear 58 held on the drive shaft so that when the drive shaft is driven the shutter will be operated as above described.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope of the appended claims.

Having thus described my invention, I claim as new and desire to secure by Letters Patent:—

1. In a shutter mechanism of the character described, the combination with a moving picture machine having an exposure window and a lens for focusing light to the window, of a box having a passage therethrough, said box being reciprocably mounted upon the machine so that its passage will be guided across the rays of light when focused from the lens to the exposure window, and means serving to impart a reciprocatory movement to the box when the machine is operated and also intermittently check the movement of the box when being reciprocated for successively registering the passage thereof with the exposure window of the machine.

2. In a shutter mechanism of the character described, the combination with a moving picture machine having an exposure window and a lens for focusing light to the window, of a box having a plurality of spaced passages therethrough, said box being reciprocably mounted upon the machine so that its passages will be guided across the rays of light when focused from the lens to the exposure window, and means serving to impart a reciprocatory movement to the box when the machine is operated and also intermittently check the movement of the box when being reciprocated for alternately registering each of the passages thereof with the exposure window of the machine.

3. In a shutter mechanism of the character described, the combination with a moving picture machine having an exposure window and a lens for focusing light to the window, of a box having a passage therethrough, said box being reciprocably mounted upon the machine so that its passage will be guided across the rays of light when focused from the lens to the exposure window, means serving to impart a reciprocatory movement to the box when the machine is operated and also intermittently check the movement of the box when being reciprocated for successively registering the passage thereof with the exposure window of the machine, and a transparent colored plate removably disposed across the passage of the box.

4. In a shutter mechanism of the character described, the combination with a moving picture machine having an exposure window and a lens for focusing light to the window, of a box having a passage therethrough, said box being reciprocably mounted upon the machine so that its passage will be guided across the rays of light when focused from the lens to the exposure window, means serving to impart a reciprocatory movement to the box when the machine is operated and also intermittently check the movement of the box when being reciprocated for successively registering the passage thereof with the exposure window of the machine, and a plurality of transparent colored plates removably disposed across the passage of the box.

5. In a shutter mechanism of the character described, the combination with a moving picture machine having an exposure window and a lens for focusing light to the window, of a box having a plurality of spaced passages therethrough, said box being reciprocably mounted upon the machine so that its passage will be guided across the rays of light when focused from the lens to the exposure window, means serving to impart a reciprocatory movement to the box when the machine is operated and also intermittently check the movement of the box when being reciprocated for alternately registering each of the passages thereof with the exposure window of the machine, and a plurality of transparent colored plates, one being removably disposed across each of the passages.

6. In a shutter mechanism of the character described, the combination with a moving picture machine adapted to be operated by the rotation of a drive shaft, said machine having an exposure window and a lens for focusing light to the window, of a box having a passage therethrough, said box being reciprocably mounted upon the machine so that its passage will be guided across the rays of light when focused from the lens to the exposure window, means serving to impart a reciprocatory movement to the box, and a cam revoluble when the drive shaft is rotated for intermittently checking the movement of the reciprocatory means, whereby the passage of the box will be successively registered with the exposure window of the machine.

7. In a shutter mechanism of the character described, the combination with a moving picture machine adapted to be operated by the rotation of a drive shaft, said machine having an exposure window and a lens for focusing light to the window, of a box having a passage therethrough, said box being reciprocably mounted upon the machine so that its passage will be guided across the rays of light when focused from the lens to the exposure window, means serving to impart a reciprocatory movement to the box, a cam revoluble when the drive shaft is rotated for intermittently checking the movement of the reciprocatory means, whereby the passage of the box will be successively registered with the exposure window of the machine, and a transparent colored plate removably disposed across the passage of the box.

8. In a shutter mechanism of the character described, the combination with a moving picture machine adapted to be operated by the rotation of a drive shaft, said machine having an exposure window and a lens for focusing light to the window, of a box having a plurality of spaced passages therethrough, said box being reciprocally mounted upon the machine so that its passages will be guided across the rays of light when focused from the lens to the exposure window, means serving to impart a reciprocatory movement to the box, and a cam revoluble when the drive shaft is rotated for intermittently checking the movement of the reciprocatory means, whereby the passages of the box will be alternately registered with the exposure window of the machine.

9. In a shutter mechanism of the character described, the combination with a moving picture machine adapted to be operated by the rotation of the drive shaft, said machine having an exposure window and a lens for focusing light to the window, of a box having a plurality of passages therethrough, said box being reciprocably mounted upon the machine so that its passages will be guided across the rays of light when focused from the lens to the exposure window, means serving to impart a reciprocatory movement to the box, a cam revoluble when the drive shaft is rotated for intermittently checking the movement of the reciprocatory means, whereby the passages of the box will be alternately registered with the exposure window of the machine, and a plurality of transparent colored plates, one being removably disposed across the passage of the box.

10. In a shutter mechanism of the character described, the combination with a moving picture machine adapted to be operated by the rotation of the drive shaft, said machine having an exposure window and a lens for focusing light to the window, of a box having a plurality of spaced passages therethrough, said box being reciprocably mounted upon the machine so that its passages will be guided across the rays of light when focused from the lens to the exposure window, means serving to impart a reciprocatory movement to the box, a cam revoluble when the drive shaft is rotated for intermittently checking the movement of the reciprocatory means, whereby the passages of the box will be alternately registered with the exposure window of the machine, and a plurality of transparent colored plates, a number of which being removably disposed across each of the passages of the box.

11. In a shutter mechanism of the character described, the combination with a moving picture machine adapted to be operated by the rotation of a drive shaft, said machine having an exposure window, and a lens for focusing light to the window, of a casing provided upon the machine between the lens and the exposure window, said casing having an aperture in register with the lens and the exposure window, a box having a plurality of spaced passages therethrough, said box being reciprocably mounted in the casing so that its passages will be guided across the rays of light when focused from the lens through the aperture of the casing and to the exposure window, anti-friction bearings provided between the walls of the box and the walls of the casing, a connecting rod pivoted to the box, two spaced rollers provided upon the rod, and a cam held upon the drive shaft so as to be rotated therewith, said cam having an irregularly curved peripheral edge and being movably arranged between the rollers of the connecting rod so as to contact therewith at intervals for reciprocating the connecting rod and the box in the casing and for also intermittently checking the movement of the box whereby the passages of the box will be alternately registered with the exposure window of the machine and with the aperture of the casing.

12. In a shutter mechanism of the character described, the combination with a moving picture machine adapted to be operated by the rotation of a drive shaft, said machine having an exposure window and a lens for focusing light to the window, of a casing provided upon the machine between the lens and the exposure window, said casing having an aperture in register with the lens and the exposure window, a box having a plurality of spaced passages therethrough, said box being reciprocably mounted in the casing so that its passages will be guided across the rays of light when focused from the lens through the aperture of the casing and to the exposure window, antifriction bearings provided between the walls of the box and the walls of the casing, a connecting rod pivoted to the box, two spaced rollers provided upon the rod, a cam held upon the drive shaft so as to be rotated therewith, said cam having an irregularly curved peripheral edge and being movably arranged between the rollers of the connecting rod so as to contact therewith at intervals for reciprocating the connecting rod and the box in the casing, and for also intermittently checking the movement of the box, whereby the passages of the box will be alternately registered with the exposure window of the machine and with the aperture of the casing, and a plurality of colored transparent plates, one being removably disposed across each of the passages of the box.

This specification signed and witnessed this nineteenth day of June A. D. 1913.

FREDERICK W. HOCHSTETTER.

Witnesses:
ROBT. B. ABBOTT,
M. DERMODY.